Patented June 16, 1936

2,043,985

UNITED STATES PATENT OFFICE 2,043,985

1-NITRO-ANTHRAQUINONYL-6-AMINO COMPOUNDS AND THEIR PRODUCTION

Earl Edson Beard, Milwaukee, Wis., assignor to E. I. du Pont de Nemours & Company, Wilmington, Del., a corporation of Delaware No Drawing. Application May 18, 1935, Serial No. 22,176

11 Claims. (Cl. 260—27)

This invention relates to carbon compounds and processes for their production. More particularly it relates to dye intermediates, dyes and colored compounds of the anthraquinone series. It especially contemplates anthraquinone derivatives having the probable formula:

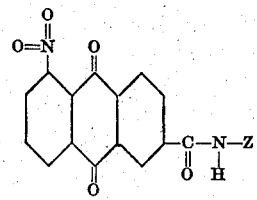

Z representing a heterocyclic carbon compound radical, residue or nucleus, and the production of such compounds from 1-nitro-anthraquinone-6-carboxylic acid.

The production of 1-nitro-anthraquinone-6-carboxylic acid is described by Eckert (1914 Monats. fur Chemie 35 289), by Beard & Lulek (U. S. Patent 1,991,191, Feb. 12, 1935) and by Beard (U. S. Patent 1,985,232, Dec. 25, 1934).

This application is in the nature of a continuation-in-part of my earlier application Ser. No. 590,640, filed Feb. 3, 1932, U. S. Patent 2,001,-701 issued May 21, 1935. In the earlier application the symbol Z in the general structural formula covered aliphatic, carbocyclic and heterocyclic nuclei. In this application the same symbol is used to represent a more limited field, namely, heterocyclic nuclei.

This invention has for an object the production of new and valuable chemical compounds. Other objects are to produce new dyes, new dye intermediates, new vat colors, new color substances, new colored compounds, to produce such products by new chemical processes and in a very desirable state of purity and physical form.

A general advance in the art and other objects which will appear hereinafter are also contemplated.

The foregoing objects and related ends are accomplished in a manner set out in the following description in which details of what is believed to be the best mode for carrying out the invention are disclosed.

Specifically one method of carrying out the invention is to treat 1-nitro-anthraquinone-6-carboxylic acid in such a way as to produce a 1-nitro-anthraquinone-6-carbonyl-halide and thereafter condense the resultant compound with a heterocyclic amine having at least one hydrogen atom attached to the amine nitrogen atom.

The invention will be further understood from a consideration of the following detailed description and specific examples in which the parts are given by weight.

PREPARATION OF 1-NITRO-ANTHRAQUINONE-6-CARBONYL HALIDES

Example I

Ten (10) parts of 1-nitro-anthraquinone-6-carboxylic acid were suspended in 100 parts of benzene. Ten (10) parts of phosphorus pentachloride were added to the suspension and the whole heated at 80° C. for one hour. The reaction mixture was then cooled to 15° C. and filtered. The cake of the acid chloride was washed with benzene and dried.

The conversion of the acid to the carbonyl halide may be carried out in other solvents or suspension agents for example, ortho-di-chlorobenzene, nitro-benzene, toluene, mono-chlorobenzene and the tri-chloro benzenes or suitable mixtures of the compounds listed; and at other temperatures depending upon the particular agent used.

Good results are also obtainable with solvent naphtha as a suspension agent. Particular mention may be made of thionyl chloride as an agent for the conversion to the desired compound. While any particular carbonyl halide may be produced, especially good results are obtainable in the case of the chloride and the bromide. If desired, the phosphorus penta-halide may be prepared in the solvent to be used later for the conversion of the carboxylic acid to carbonyl halide. This may be accomplished, for example, by adding phosphorus tri-chloride to the solvent and then passing a stream of chlorine gas through the solution until the theoretical amount has been added or absorbed according to the equation:

$PCl_3 + Cl_2 \rightarrow PCl_5$

PREPARATION OF 1-NITRO-ANTHRAQUINONE-6-ACYL AMINO COMPOUNDS

*Example II*

Ten (10) parts of 1-nitro-anthraquinone-6-carbonyl chloride were condensed with 6.2 parts of beta-amino-phenazine, utilizing 150 parts of chlorobenzene as a solvent medium. After heating the reactants at 125°–135° C. for 1 hour the mass was cooled to 75° C. and filtered.

In a similar manner, 1-nitro-anthraquinone-6-carbonyl halides may be condensed with such compounds as 2-amino-phenanthridone, 2-amino-diphenylene-oxide, 4-amino-acridone, 4-amino-thioxanthone, 3-amino-carbazole, 2,2'-di-amino-diphenylene-sulfide, 1,3 - di-amino - phenoxthin and 2,7-di-amino-xanthone.

*Example III*

Ten (10) parts of 1-nitro-anthraquinone-6-carbonyl chloride and 10.7 parts of 5'-amino-anthraquinonyl-1(N)-2(N)-2'(C)-phenyl-imidazole were mixed and agitated with 200 parts of nitrobenzene at 150° C. during 1 to 2 hours. Thereafter the reaction mass was cooled to 40° C. and the resultant dye separated by filtration.

*Example IV*

Ten (10) parts of 1-nitro-anthraquinone-6-carbonyl chloride and 5 parts of para-amino-phenyl morpholine were mixed and agitated at 50°–70° C. After one hour, dilute hydrochloric acid was added to take up any remaining para-amino-phenyl morpholine and the 1-nitro-anthraquinone - 6 - carbonyl - 4' - amino - phenyl - morpholine removed by filtration.

In a similar manner, 1-nitro-anthraquinone-6-carbonyl halides may be condensed with such compounds as 5-amino-8-ethoxy-quinoline, piperidine, di-amino-di-naphthalene-d'oxide, tetrahydro-alpha-furfuryl amine, di-alpha-furfuryl amine, perimidone, 3,6-di-amino-fluoran and 4,4'-di-amino-indanthrone.

*Example V*

Thirty-five (35) parts of 1-nitro-anthraquinone-6-carbonyl chloride and 20 parts of para-amino-phenyl-(N)-morpholine were mixed and agitated in 500 parts of nitrobenzene at 140° C. during one hour. Thereafter the reaction mass was cooled to 35° C., filtered and washed with nitrobenzene and alcohol in the order mentioned. This morpholine derivative gives a yellow sulfuric acid solution color, a reddish-brown colored alkaline hydrosulfite vat and is characterized by having a readily reducible nitro group.

*Example VI*

Ten (10) parts of 1-nitro-anthraquinone-6-carbonyl chloride and 7 parts of 1,9-pyrazol-anthrone were heated together in 150 parts of ortho-dichlorobenzene at 160° C. for 2 hours. The condensation product was filtered off at 70° C. and washed with ortho-di-chlorobenzene and alcohol. This process gives a product which dissolves in sulfuric acid, coloring the resultant solution yellow to orange. The product vats from an alkaline hydrosulfite vat as a red-brown solution.

*Example VII*

Ten (10) parts of 1-nitro-anthraquinone-6-carboxylic acid chloride and 8 parts of 1,9-anthraisothiazole-5-amine were heated together in 250 parts of nitrobenzene at 150° C. for two and one-half hours. The resultant product was isolated by filtration at 80° C. and washed with nitrobenzene and alcohol, and thereafter dried. The product gives a yellow to orange color in sulfuric acid. Its alkaline hydrosulfite vat is red-brown colored.

*Example VIII*

Ten (10) parts of 1-nitro-anthraquinone-6-carbonyl chloride and 7 parts of 1,9-pyrazol-anthrone were heated together in 150 parts of nitrobenzene at 160°–165° C. for 2 hours. The condensation product was filtered off at 70° C. and washed with nitrobenzene and alcohol. This process gives a product which dissolves in sulfuric acid, coloring the resultant solution yellow to orange and vats as a reddish-brown solution.

*Example IX*

Ten (10) parts of 1-nitro-anthraquinone-6-carboxylic acid chloride and 7.5 parts of 1,9-anthraisothiazole-5-amine were heated together in 200 parts of nitrobenzene at 160° C. for 2 hours. The resultant product was filtered off at about 80° C. and washed with nitrobenzene and alcohol and thereafter dried. The product gives a yellow to orange color in sulfuric acid and a reddish-brown vat.

*Example X*

Ten (10) parts of 1-nitro-anthraquinone-6-carboxylic acid chloride and 8 parts of 1,9-anthraisoselenazole-5-amine were heated together in 200 parts of nitrobenzene at 150° C. for two hours. The resultant product was filtered off at 80° C. and washed with nitrobenzene and alcohol, and thereafter dried. The product gives a yellow to orange color in sulfuric acid and a red-brown colored alkaline hydrosulfite vat.

*Example XI*

Fifty (50) parts of 1-nitro-anthraquinone-6-carbonyl chloride and 40 parts of 1,9-anthraisothiazole-4-amine were mixed together and agitated in 1000 parts of nitrobenzene at 140°–150° C. during 2 hours and thereafter isolated according to the procedure given in Example X.

*Example XII*

Fifty (50) parts of 1-nitro-anthraquinone-6-carbonyl chloride and 40 parts of 1,9-anthraisoselenazole-4-amine were mixed together and agitated in 1000 parts of nitrobenzene at 140°–150° C. during 2 hours and thereafter isolated according to the procedure given in Example X.

*Example XIII*

Fifty (50) parts of 1-nitro-anthraquinone-6-carbonyl chloride and 40 parts of 1,9-anthraisothiazole-2-amine were mixed and agitated in 800 parts of trichlorobenzene at 150° C. during 1-2 hours and thereafter cooled and filtered.

*Example XIV*

Fifty (50) parts of 1-nitro-anthraquinone-6-carbonyl chloride and 40 parts of 1,9-anthrathiophene-2-amine were mixed and agitated in 800 parts of trichlorobenzene at 150° C. during 1-2 hours, thereafter cooled and filtered.

*Example XV*

Twenty-five (25) parts of 1-nitro-anthraquinone-6-carbonyl chloride and 20 parts of 1,9-anthraisothiazole-8-amine were ground together and added to 400 parts of nitrobenzene at 130° C. The reaction mass was heated at 175° C. during ½ to 1 hour, thereafter cooled to 70° C. The condensation product which separates out in yellow crystals was filtered off and washed as described in the preceding examples.

Example XVI

Twenty-five (25) parts of 1-nitro-anthraquinone-6-carbonyl chloride and 37 parts of 5'-amino-1(S)-2,2'-di-anthraquinonyl-thiazole were mixed and heated at 160° C. in 800-1000 parts of nitrobenzene during 1-2 hours. The reaction mass was then cooled to 100° C. and filtered to isolate the resulting dye.

This compound probably has the formula:

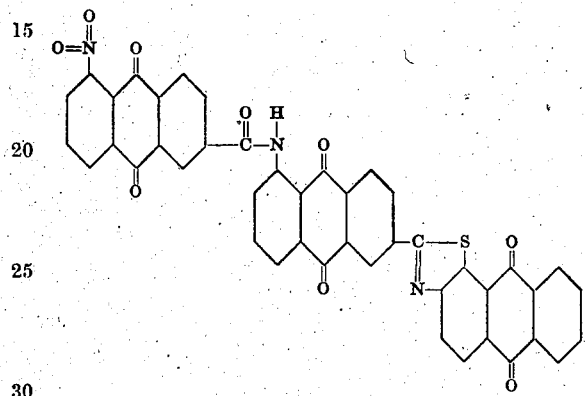

Example XVII

Ten (10) parts of 1-nitro-anthraquinone-6-carbonyl chloride and 12.7 parts of 5-ethoxy-phenyl-1,2,2'-anthraquinonyl-thiazole-5'-amine were added to 250-300 parts of nitrobenzene and the resultant heated with agitation at 160° C. for about 2 hours. After cooling the reaction mass to 30°-40° C. the dye obtained was isolated by filtration.

Example XVIII

Ten (10) parts of 1-nitro-anthraquinone-6-carbonyl chloride were mixed with 8.4 parts of 1,9-pyrazole-anthrone-6-carboxylic acid and agitated with 250 parts of nitrobenzene at 150° C. during 2 hours. The reaction mass was cooled to 40° C. and the dye obtained separated by filtration.

Example XIX

Ten (10) parts of 1-nitro-anthraquinone-6-carbonyl chloride were condensed with 37 parts of 1'-amino-1(S)2,2'-di-anthraquinonyl-thiazole in 900 parts of nitrobenzene while heating at 160° C. The heating was continued for 2 hours after which the reaction mass was cooled to 100 C. and filtered.

The product obtained probably has the following formula:

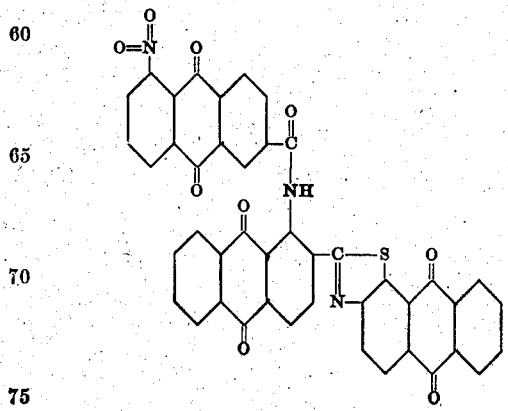

Example XX

Ten (10) parts of 1-nitro-anthraquinone-6-carbonyl chloride were condensed with 17 parts of 1(Se)2,2'-di-anthraquinonyl-selenazole-5'-amine in 850-950 parts of nitrobenzene while heating at 155°-165° C. The heating was continued for about 2 hours, after which time the reaction mass was cooled to 100° C. and filtered in order to isolate the desired dyestuff.

Example XXI

Ten (10) parts of 1-nitro-anthraquinone-6-carbonyl chloride were condensed with 17 parts of 1,2,2'-di-anthraquinonyl-selenazole-1'-amine in a manner similar to that described in the preceding example.

Example XXII

Ten (10) parts (2 mols) of 1-nitro-anthraquinone-6-carbonyl chloride and 7.2 parts (1 mol) of 4,4'-diamino-1,1'-di-anthrimide carbazole were mixed and agitated in 300-400 parts of nitrobenzene at 160°-180° C. during 2-4 hours. The reaction mass was then cooled to 80° C. and filtered, thereafter washed with nitrobenzene and alcohol, and dried.

Example XXIII

Ten (10) parts (2 mols) of 1-nitro-anthraquinone-6-carbonyl chloride and 7.2 parts (1 mol) of 5,5'-diamino-1,1'-di-anthrimide carbazole were mixed and agitated in 300-500 parts of nitrobenzene at 160°-180° C. during 2-4 hours. The reaction mass is then cooled to 80° C. and filtered, thereafter washed with nitrobenzene and alcohol, and dried.

Example XXIV

Ten (10) parts (2 mols) of 1-nitro-anthraquinone-6-carbonyl chloride and 7.2 parts (1 mol) of 4,5'-diamino-1,1'-di-anthrimide carbazole are mixed and agitated in 300-500 parts of nitrobenzene at 160°-180° C. during 2-4 hours. The reaction mass is then cooled to 80° C. and filtered, thereafter washed with nitrobenzene and alcohol, and dried.

Example XXV

Ten (10) parts (1 mol) of 1-nitro-anthraquinone-6-carbonyl chloride and 14.4 parts (1 mol) of 4,4'-di-amino-1,1'-di-anthrimide-carbazole were condensed in 300-400 parts of nitrobenzene, care being taken to add the acid chloride slowly to the suspension media containing the di-amino-carbazole compound, over a period of 1 hour while maintaining the temperature at 200°-215° C. Thereafter, the temperature was allowed to fall to 70° C. during a period of about 2 hours after which time the mono-acidylated compound was filtered off.

Example XXVI

Ten (10) parts of 1-nitro-anthraquinone-6-carbonyl chloride and 22 parts of the amine prepared by hydrolysis of the carbazolized condensation product of 1-benzoylamino-5-chloro-anthraquinone and 5'-amino-1(S)2,2'-dianthraquinonyl thiazole, were condensed in 500 parts of nitrobenzene at 180° C. during 2-3 hours. Thereafter the reaction mass is cooled to 80°-100° C. and filtered.

This resultant dye probably has the following formula:

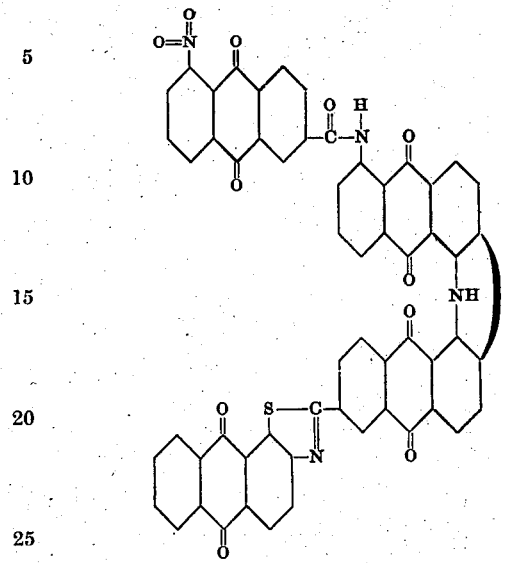

Example XXVII

Ten (10) parts of 1-nitro-anthraquinone-6-carbonyl chloride and 14 parts of 5'-amino-1,1'-di-anthrimide carbazole (prepared by hydrolysis of 5'-benzoylamino-1,1'-di-anthrimide carbazole disclosed in Example 6 of German Patent 566,708, and Example 6 of French Patent 711,433,) were mixed and agitated in 300 parts of nitrobenzene at 160°–180° C. during 2–3 hours. The reaction mass was then cooled to 80°–100° C. and filtered. The dye obtained probably has the following formula:

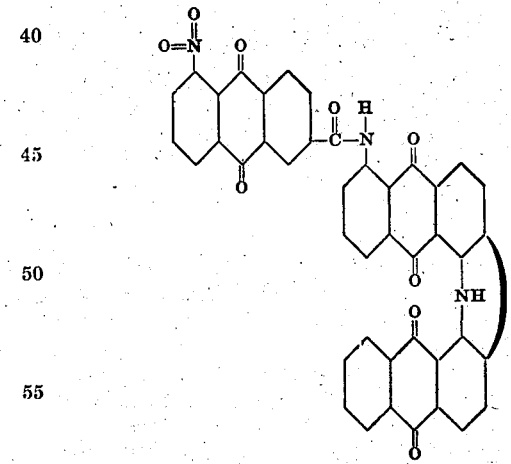

Example XXVIII

Ten (10) parts of 1-nitro-anthraquinone-6-carbonyl chloride and 11 parts of mono-amino-1(S)2(N)-anthraquinonyl-(C)-phenyl-thiazole (prepared by reduction of the mono-nitration product of 1(S)2(N)-anthraquinonyl-(C)-phenyl-thiazole) were mixed with 300 parts of nitrobenzene and heated with agitation to 160°–180° C. during 2–3 hours. Thereafter the dyestuff was isolated by filtration.

Example XXIX

Ten (10) parts of 1-nitro-anthraquinone-6-carbonyl chloride were condensed with 8.7 parts of 1(N-methyl)-9-anthra-pyridone-4-amine in 200 parts of nitrobenzene while heating at 140°–150° C. for a period of 2 hours. The dye obtained was isolated by filtration, after cooling to 80° C.

Example XXX

Ten (10) parts of 1-nitro-anthraquinone-6-carbonyl chloride were condensed with 8.7 parts of 1(N-methyl)-9-anthra-pyridone-5-amine in 200 parts of nitrobenzene while heating at 140°–150° C. for a period of 2 hours. The dye obtained was isolated by filtration, after cooling to 80° C.

Example XXXI

The nitro group in the product obtained according to Example XXIX was reduced by vatting the compound in alkaline sodium hydrosulfite according to procedures well known in the dyestuff art. The amino body was then isolated and 16.7 parts of same were condensed with 10 parts of 1-nitro-anthraquinone-6-carbonyl chloride in 300–400 parts of nitrobenzene while maintaining a temperature of 150°–160° C. over a period of 2–3 hours. The resultant mass was cooled to 60° C. and the condensation product isolated by filtration.

Example XXXII

The nitro group in the product obtained according to Example XXX was reduced by vatting the compound in sodium hydrosulfite. The amino body was then isolated and condensed (16.7 parts) with 1-nitro-anthraquinone-6-carbonyl chloride (10 parts) according to the method outlined in Example XXXI.

As will be apparent from the foregoing, the invention is not limited to the particular amines utilized in the specific examples. It is of general character. However, certain amines merit special mention for example:

1,9-anthraisothiazole-5-amine, having the formula:

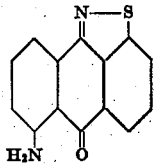

1,9-anthraisothiazole-4-amine,
1,9-anthraisothiazole-2-amine,
1,9-anthraisothiazole-8-amine,
1,9-anthraisoselenazole-4-amine, having the formula:

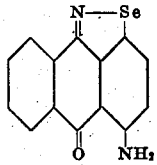

1,9-anthraisoselenazole-2-amine,
1,9-anthraisoselenazole-8-amine,
1,9-anthraisoselenazole-5-amine,
Piperidine, having the formula:

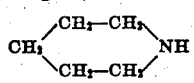

5-amino-8-ethoxy-quinoline, having the formula:

6-methoxy-8-amino-quinoline,
1 - a m i n o - anthraquinonyl-6(C)1'(N)2'(N)-phenyl-imidazole, having the formula:

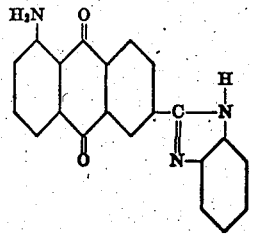

5'- amino-1:1'- di-anthrimide-carbazole, having the formula:

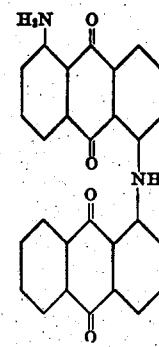

5-amino-1,1'-di-anthrimide carbazole-6'(C)1''(S)-2''(N)-anthraquinonyl thiazole, having the formula:

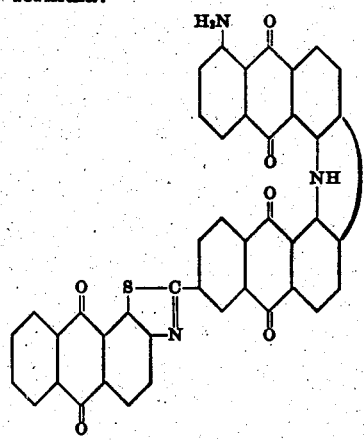

para-amino-phenyl-(N)-morpholine, having the formula:

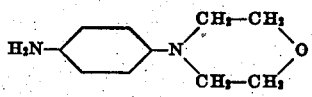

1-amino-5-(1',9'-anthraisothiazoyl - 2') - amino-anthraquinone, having the formula:

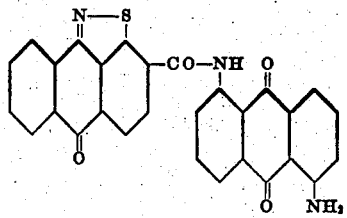

1-amino-8-(1',9'-anthraisothiazoyl - 2') - amino-anthraquinone, 1-amino-4-(1',9'-anthraisothiazoyl - 2') - amino-anthraquinone,
5-amino - 1(2',1'N - anthraquinone - benzacridone-6'-carbonyl)-amino-anthraquinone,
8-amino - 1(2',1'N - anthraquinone - benzacridone-6'-carbonyl)-amino-anthraquinone,
5-amino - 1(2',1'N - anthraquinone-2'':3''(N) - naphthacridone - 6'- carbonyl) - amino - anthraquinone, having the formula:

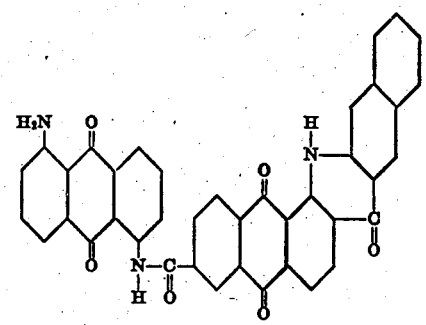

1-amino-5(1',9'-anthraisoselenazoyl-2') - amino-anthraquinone,
1-amino-8(1',9'-anthraisoselenazoyl-2') - amino-anthraquinone,
1-amino-4(1',9'-anthraisoselenazoyl-2') - amino-anthraquinone,
6,6'-di-carbonyl-di-(4''-amino-1'' - anthraquinone-imide)-thioindigo,
6,6'-di-carbonyl-di-(5''-amino-1'' - anthraquinone-imide)-thioindigo,
6,6'-di-carbonyl-di-(8''-amino-1'' - anthraquinone-imide)-thioindigo,
4-amino-1-(7''-chloro - 5'',6'' - benzisatin - 2'-thio-naphthene-3''-indole-indigo-7'-carbonyl)-amino-anthraquinone, probably having the formula:

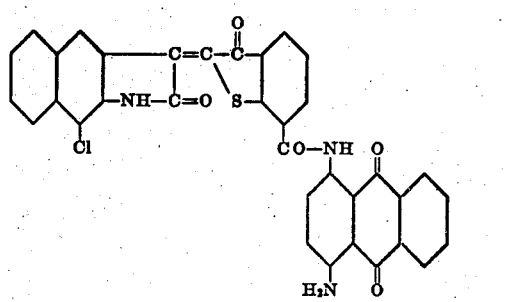

7,7'-di-carbonyl-di-(4''-amino-1'' - anthraquinone-imide)-thioindigo,
7,7'-di-carbonyl-di-(5''-amino-1'' - anthraquinone-imide)-thioindigo,
7,7'-di-carbonyl-di-(8''-amino-1'' - anthraquinone-imide)-thioindigo,
4-amino-1-(7''-chloro - 5'',6'' - benzisatin - 2'-thio-naphthene-3''-indole-indigo-6'-carbonyl)-amino-anthraquinone,
5-amino-1-(7''-chloro - 5'',6'' - benzisatin - 2'-thio-naphthene-3''-indole-indigo-6'-carbonyl)-amino-anthraquinone,
8-amino-1-(7''-chloro - 5'',6'' - benzisatin - 2'-thio-naphthene-3''-indole-indigo-6'-carbonyl)-amino-anthraquinone,
4-amino-1- (5'',7'' - di - chloro - 2' - thionaphthene-3''-indole-indigo-7'-carbonyl)-amino-anthraquinone, 5 - amino - 1 - (5",7"-di-chloro- 2' - thionaph-
thene-3"'-indole-indigo-7'-carbonyl)-amino-
anthraquinone,
8-amino-1-(5",7"-di-chloro-2' - t h i o n a p h-
thene-3"'-indole-indigo-7'-carbonyl)-amino-
anthraquinone,
Aminoanthraquinone-1(S),2(N),5(S),6(N), di-
phenyl-di-thiazole,
Amino-anthraquinone-1(N)-naphthacridone,
The reduced condensation product of 1-nitro-
anthraquinone-6-carbonyl-chloride and 3,3'-
di-mercapto-benzidine, probably having the
formula:

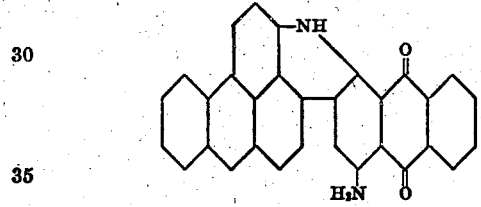

The reduced condensation product of 1-nitro-
anthraquinone-6-carbonyl-chloride and 3,3'-
dihydroxy-benzidine,
4'-amino-anthraquinone-1'-Bzl-benzanthrone-
acridine, probably having the formula:

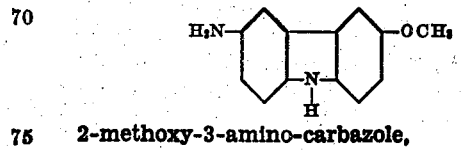

5'-amino-anthraquinone-1'-Bzl-benzanthrone-
acridine,
8'-amino-anthraquinone-1'-Bzl-benzanthrone-
acridine,
4'-amino-anthraquinone - 1',2 - benzanthrone-
acridine,
5'-amino-anthraquinone - 1',2 - benzanthrone-
acridine,
8'-amino-anthraquinone - 1',2 - benzanthrone-
acridine,
Amino-benzanthrone-anthraquinone - acridine
(reduced nitration product of benzanthrone-
anthraquinone-acridine),
Amino-benzanthrone-anthraquinone - acridine
(amidated halogenation product of benzan-
throne-anthraquinone-acridine),
5-amino-1-(7"'-chloro - 5",6" - benzisatin - 2'-
thionaphthene-3"-indole-indigo-7' - carbon-
yl)-amino-anthraquinone,
8-amino-1-(7"'-chloro - 5",6" - benzisatin - 2'-
thionaphthene-3"-indole - indigo-7'-carbon-
yl)-amino-anthraquinone,
N-Amino-iso-indigotine,
3-amino-naphthalic acid anhydride,
1,3-di-amino-phenoxthine,
2,4-di-amino-phenoxthine,
4-amino-1,9(1'-methyl)-anthrapyrimidone,
5-amino-1,9(1'-ethyl) anthrapyrimidone,
4-amino-1,9- (1-N-methyl)-anthrapyrimidone,
and
5-amino-1,9-(1-N-methyl)-anthrapyrimidone.
6-amino-3-methoxy-carbazole, having the for-
mula:

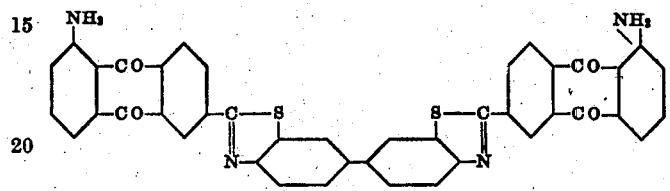

2-methoxy-3-amino-carbazole, 2-ethoxy-3-amino-carbazole,
1-ethoxy-3-amino-carbazole,
2-benzyloxy-3-amino-carbazole,
1,8-di-ethoxy-3,6-di-amino-carbazole,
4-amino-anthraquinone-1- (S) -2-phenyl - thi-
oxanthone, having the formula:

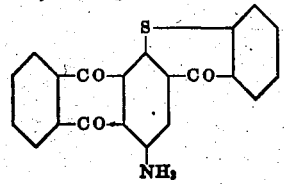

5-amino-anthraquinone-1(S) 2-phenyl - thiox-
anthone
3-amino-2-methoxy-N-methyl-carbazole,
1-amino-carbazole,
1-amino-3,6-di-bromo-carbazole,
1-amino-carbazole-3,6-di-sulfonic acid,
2-amino-carbazole-7-sulfonic acid,
2-amino-7-hydroxy-carbazole,
2-amino-carbazole
4-amino - 1 (2',1'N - anthraquinone - benzacri-
done-6' - carbonyl) - amino - anthraquinone,
having the formula:

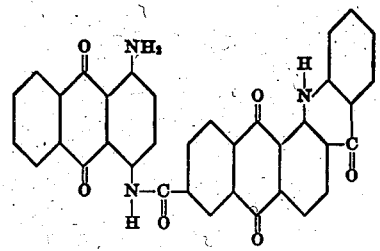

4-amino-1(2',1'N - anthraquinone - 2",3" (N) -
naphthacridone - 6' - carbonyl) - amino - an-
thraquinone,
8-amino-1(2',1'N - anthraquinone - 2",3" (N) -
naphthacridone - 6' - carbonyl) - amino - an-
thraquinone,
8 - amino - 1 (2",1"N - anthraquinone - 1',2'N-
naphthacridone - 6' - carbonyl) - amino - an-
thraquinone, having the formula:

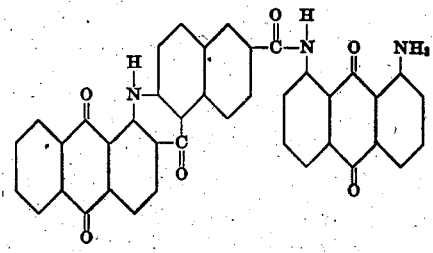

4 - amino - 1(2",1"N - anthraquinone - 1',2'N-
naphthacridone - 6' - carbonyl) - amino - an-
thraquinone,
5 - amino - 1(2",1"N - anthraquinone - 1',2'N-
naphthacridone - 6' - carbonyl) - amino - an-
thraquinone,
8 - amino - 1(2",1"N - anthraquinone - 1',2'N- benzacridone-3'-carbonyl) - amino - anthraquinone, having the formula:

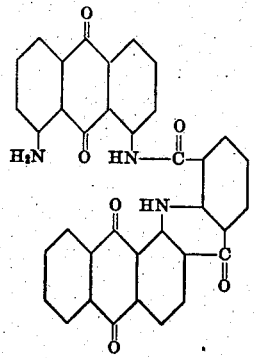

4 - amino - 1(2'',1'' N - anthraquinone - 1',2'N-benzacridone-3'-carbonyl) - amino - anthraquinone,
5 - amino - 1(2'',1'' N - anthraquinone - 1',2'N-benzacridone-3'-carbonyl) - amino - anthraquinone,
4 - amino - 1(2'',1'' N - anthraquinone - 1',2'N-benzacridone-5'-carbonyl) - amino - anthraquinone, having the formula:

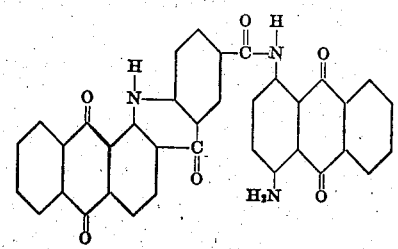

5 - amino - 1(2'',1''N - anthraquinone - 1',2'N-benzacridone-5'-carbonyl) - amino - anthraquinone,
8 - amino - 1(2'',1''N - anthraquinone - 1',2'N-benzacridone-5'-carbonyl) - amino - anthraquinone,
5-amino-1(2',1'S - anthraquinone - benz - thioxanthone - 6 - carbonyl) - amino - anthraquinone, having the formula

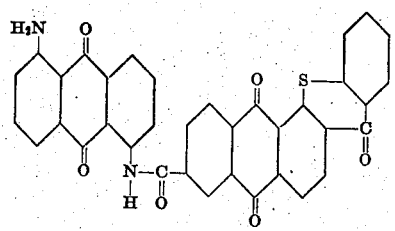

4 - amino-1(2',1'S - anthraquinone - benz-thioxanthone - 6'-carbonyl) -amino - anthraquinone,
8-amino-1(2',1'S-anthraquinone - benz - thioxanthone - 6' - carbonyl) -amino - anthraquinone,
5-amino-1(2'',1''S-anthraquinone-1',2'S-benzthioxanthone-6'-carbonyl)- amino - anthraquinone, having the formula:

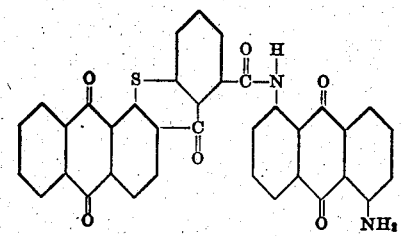

4-amino-1(2'',1''S-anthraquinone-1',2'S-benzthioxanthone-6'-carbonyl) - amino - anthraquinone,
8-amino-1(2'',1''S-anthraquinone-1',2'S-benzthioxanthone-6'-carbonyl) - amino - anthraquinone,
8-amino-1(2'',1''S-anthraquinone-1',2'S-benzthioxanthone-5'-carbonyl) - amino - anthraquinone, having the formula:

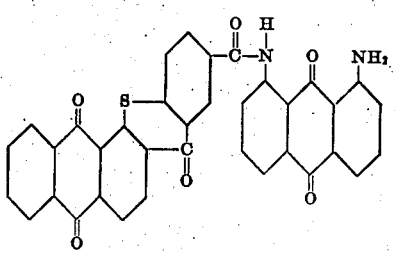

5-amino-1(2'',1''S-anthraquinone-1',2'S-benzthioxanthone-5'-carbonyl) - amino - anthraquinone,
4-amino-1(2'',1''S-anthraquinone-1',2'S-benzthioxanthone-5'-carbonyl) - amino - anthraquinone,
4-amino-1(2'',1''S-anthraquinone-1',2'S-benzthioxanthone-3'-carbonyl) - amino - anthraquinone, having the formula:

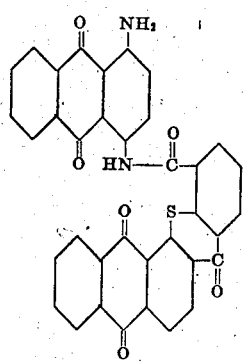

5-amino-1(2'',1''S-anthraquinone-1',2'S-benzthioxanthone-3'-carbonyl) - amino - anthraquinone,
8-amino-1(2'',1''S-anthraquinone-1',2'S-benzthioxanthone-3'-carbonyl) - amino - anthraquinone,
8-amino-1(1'',2''S-anthraquinone-1',2'S-benzthioxanthone-5'-carbonyl) - amino - anthraquinone, having the formula:

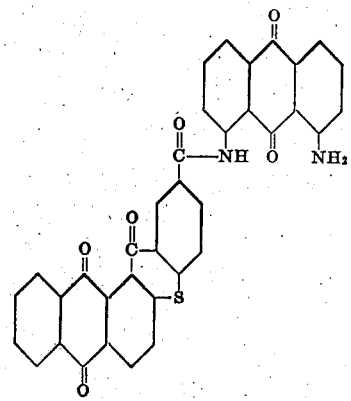

4-amino-1(1'',2''S-anthraquinone-1',2'S-benz-
thioxanthone-5'-carbonyl)- amino - anthra-
quinone,
5-amino-1(1'',2''S-anthraquinone-1',2'S-benz-
thioxanthone-5'-carbonyl)- amino - anthra-
quinone,
8-amino-1(1'',2''S-anthraquinone-1',2'S-benz-
thioxanthone-3'-carbonyl)- amino - anthra-
quinone, having the formula:

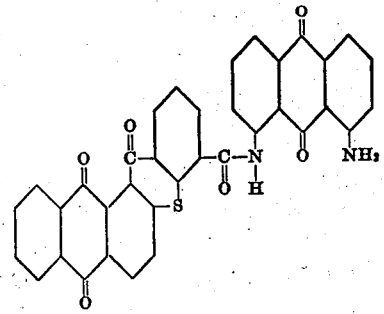

4-amino-1(1'',2''S-anthraquinone-1',2'S-benz-
thioxanthone-3'-carbonyl)- amino - anthra-
quinone,
5-amino-1(1'',2''S-anthraquinone-1',2'S-benz-
thioxanthone-3'-carbonyl)- amino - anthra-
quinone,
8-amino-1(2'',3''S-anthraquinone-1',2'S-benz-
thioxanthone-3'-carbonyl)- amino - anthra-
quinone, having the formula:

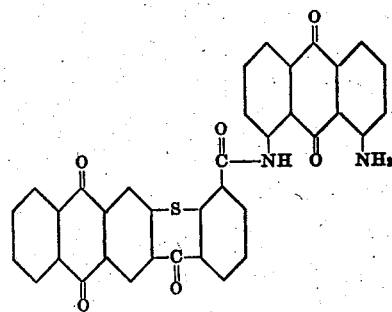

4-amino-1(2'',3''S-anthraquinone-1',2'S-benz-
thioxanthone-3'-carbonyl)- amino - anthra-
quinone,
5-amino-1(2'',3''S-anthraquinone-1',2'S-benz-
thioxanthone-3'-carbonyl)- amino - anthra-
quinone,
4-amino-1(2'',3''S-anthraquinone-1',2'S-benz-
thioxanthone-4'-carbonyl)- amino - anthra-
quinone, having the formula:

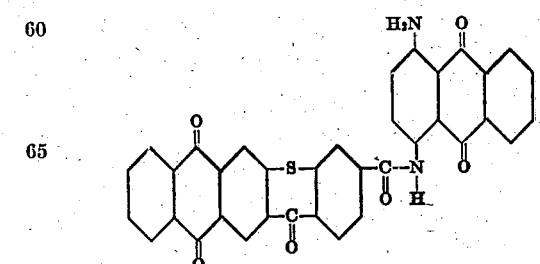

5-amino-1(2'',3''S-anthraquinone-1',2'S-benz-
thioxanthrone-4'-carbonyl)-amino - anthra-
quinone.
8-amino-1(2'',3''S-anthraquinone-1',2'S-benzthioxanthrone-4'-carbonyl)-amino - anthra-
quinone.
4-amino-1(2'',3''S-anthraquinone-1',2'S-benz-
thioxanthone-5'-carbonyl) -amino - anthra-
quinone, having the formula:

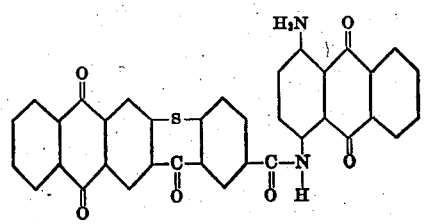

5-amino-1(2'',3''S-anthraquinone-1',2'S-benz-
thioxanthone-5'-carbonyl) -amino - anthra-
quinone.
8 - amino - 1(2'',3''S - anthraquinone - 1',2'S-
thioxanthone-5'-carbonyl) -amino - anthra-
quinone.

In the compounds set out above, the di-amino-
anthraquinone radicals may be replaced by di-
amino - benzenes, di - amino - naphthalenes, di -
amino-biphenyls and the like.

Other compounds to be especially noted are:
4-amino- 1(2'-phenyl-quinoline- 4'-carbonyl)-
amino-anthraquinone, having the formula:

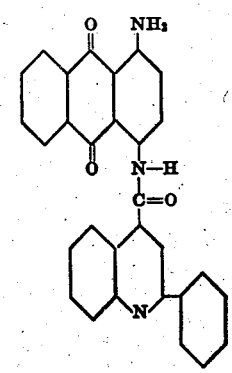

5-amino-1(2'-phenyl - quinoline-4'-carbonyl)-
amino-anthraquinone,
8-amino-1(2'-phenyl-quinoline- 4'- carbonyl)-
amino-anthraquinone,
5-amino-1(2'-phenyl-8'-methoxy-quinoline-4'-
carbonyl)-amino-anthraquinone, having the
formula:

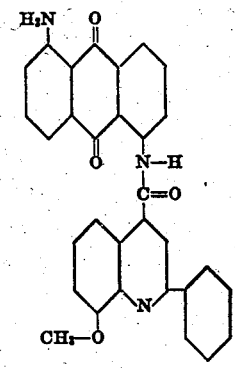

4-amino- 1(2'-phenyl- 8'-ethoxy-quinoline-4'-
carbonyl)-amino-anthraquinone,
8-amino- 1(2'- phenyl- 8'-isobutoxy-quinoline-
4'-carbonyl)-amino-anthraquinone,
8-amino-1(3''-ethoxy-phenyl-2'-quinoline-4'- carbonyl)-amino-anthraquinone, having the formula:

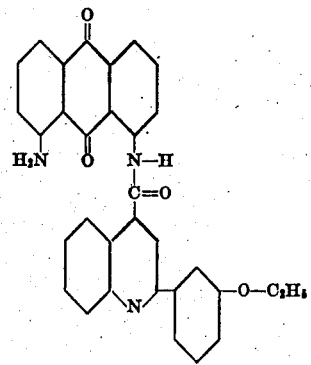

5-amino-1(3''-ethoxy-phenyl-2'-quinoline-4'-carbonyl)-amino-anthraquinone,
4-amino-1(3''-ethoxy-phenyl-2'-quinoline-4'-carbonyl)-amino-anthraquinone,
5-amino-1(2'-thionyl-quinoline-4'-carbonyl)-amino-anthraquinone, having the formula:

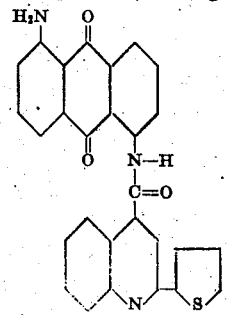

8-amino-1(2'-thionyl-quinoline-4'-carbonyl)-amino-anthraquinone,
4-amino-1(2'-thionyl-quinoline-4'-carbonyl)-amino-anthraquinone,
4-amino-1(2'-beta''-naphthyl-quinoline-4'-carbonyl)-amino-anthraquinone, having the formula:

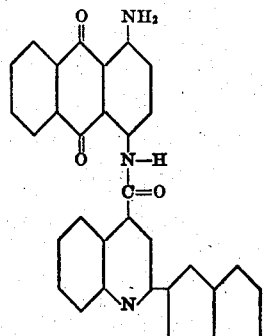

5-amino-1(2'-alpha''-naphthyl-quinoline-4'-carbonyl)-amino-anthraquinone,
8-amino-1(2'-alpha''-naphthyl-quinoline-4'-carbonyl)-amino-anthraquinone,
Amino-di-naphthalene-dioxide, probably having the formula:

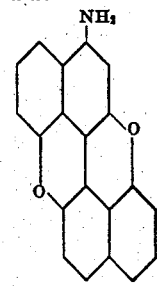

Di-amino-di-naphthalene-dioxide, probably having the formula:

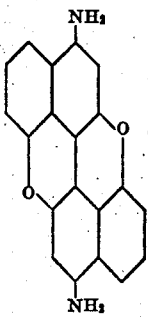

Di-amino-pyracridone,
1-amino-2(N)-3-pyridino-anthraquinone, having the formula:

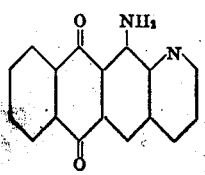

Amino-1-2(N)-pyridino-anthraquinone,
Amino-1(N)-2-pyridino-anthraquinone,
3-amino-2(N)-1-pyridino-anthraquinone,
Amino-nitro-2(N)-1-pyridino-anthraquinone,
1-amino-nitro-2(N)-3-pyridino-anthraquinone,
8-amino-1(N)-2-pyridino-anthraquinone,
5-amino-1(N)-2-pyridino-anthraquinone,
4-amino-1(N)-2-pyridino-anthraquinone,
Di-amino-2(N)-3-pyridino-anthraquinone,
Tri-amino-2(N)-1-pyridino-anthraquinone,
Amino-4-methoxy-1(N)-2-pyridino-anthraquinone,
2-amino-phenanthridone, probably having the formula:

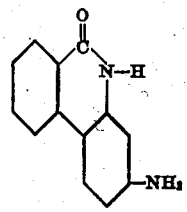

4-amino-acridine, having the formula:

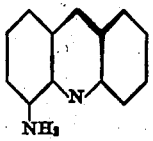

2-methyl-4-amino-acridine,
2-methyl-4-di-ethyl-amino-ethyl-amino-acridine,
3,6-di-amino-acridine,
3-amino-6-di-ethyl-amino-ethyl-amino-acridine,
4-amino-10-thioxanthone, having the formula:

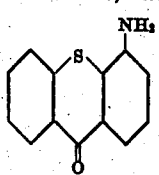

1-amino-10-thioxanthone,
2-amino-10-thioxanthone,
3-amino-10-thioxanthone,
4-amino-1-methyl-thioxanthone, 1-amino-4-methoxy-2-methyl-thioxanthone,
4-amino-anthrathiophene, having the formula:

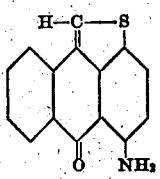

Tetra-hydro-alpha-furfuryl-amine, having the formula:

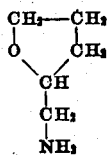

Di-alpha-furfuryl-amine, having the formula:

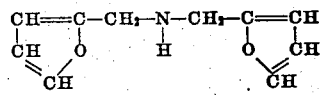

4-amino-1(5''-chloro-2''-thionaphthene-3'-indole-indigo-7'-carbonyl)-amino-anthraquinone having the formula:

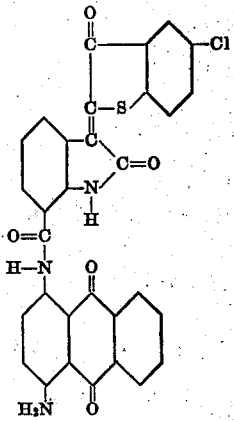

5-amino-1(5''-chloro-2''-thionaphthene-3'-indole-indigo-7'-carbonyl)-amino-anthraquinone,
8-amino-1(5''-chloro-2''-thionaphthene-3'-indole-indigo-7'-carbonyl)-amino-anthraquinone,
5-amino-1(4'',5''-benzo-2''-thionaphthene-3'-indole-indigo-7'-carbonyl)-amino-anthraquinone,
4-amino-1(4'',5''-benzo-2''-thionaphthene-3'-indole-indigo-7'-carbonyl)-amino-anthraquinone,
8-amino-1(4'',5''-benzo-2''-thionaphthene-3'-indole-indigo-7'-carbonyl)-amino-anthraquinone,
8-amino-1(5'',5'-di-chloro-2''-thionaphthene-3'-indole-indigo-7'-carbonyl)-amino-anthraquinone,
5-amino-1(5'',5'-di-chloro-2''-thionaphthene-3'-indole-indigo-7'-carbonyl)-amino-anthraquinone,
4-amino-1(5'',5'-di-chloro-2''-thionaphthene-3'-indole-indigo-7'-carbonyl)-amino-anthraquinone,
5-amino-1(5''-methoxy-2''-thionaphthene-3'-indole-indigo-5'-carbonyl)-amino-anthraquinone,
4-amino-1(5''-methoxy-2''-thionaphthene-3'-indole-indigo-5'-carbonyl)-amino-anthraquinone,
8-amino-1(5''-methoxy-2''-thionaphthene-3'-indole-indigo-5'-carbonyl)-amino-anthraquinone,
4-amino-1(4''-methyl-6''-chloro-2''-thionaphthene-3'-indole-indigo-7'-carbonyl)-amino-anthraquinone,
5-amino-1(4''-methyl-6''-chloro-2''-thionaphthene-3'-indole-indigo-7'-carbonyl)-amino-anthraquinone,
8-amino-1(4''-methyl-6''-chloro-2''-thionaphthene-3'-indole-indigo-7'-carbonyl)-amino-anthraquinone,
4-amino(6''-ethoxy-2''-thionaphthene-3'-indole-indigo-7'-carbonyl)-amino-anthraquinone,
5-amino(6''-ethoxy-2''-thionaphthene-3'-indole-indigo-7'-carbonyl)-amino-anthraquinone,
8-amino(6''-ethoxy-2''-thionaphthene-3'-indole-indigo-7'-carbonyl)-amino-anthraquinone,
4-amino-1(5''-bromo-2''-thionaphthene-5'-chloro-3'-indole-indigo-7'-carbonyl)-amino-anthraquinone,
5-amino-1(5''-bromo-2''-thionaphthene-5'-chloro-3'-indole-indigo-7'-carbonyl)-amino-anthraquinone,
8-amino-1(5''-bromo-2''-thionaphthene-5'-chloro-3'-indole-indigo-7'-carbonyl)-amino-anthraquinone,
4-amino-1(4'',6''-di-methyl-2''-thionaphthene-3'-indole-indigo-7'-carbonyl)-amino-anthraquinone,
5-amino-1(4'',6''-di-methyl-2''-thionaphthene-3'-indole-indigo-7'-carbonyl)-amino-anthraquinone,
8-amino-1(4'',6''-di-methyl-2''-thionaphthene-3'-indole-indigo-7'-carbonyl)-amino-anthraquinone,
4-amino-1(5'',6'':7''-tri-chloro-2''-thionaphthene-3'-indole-indigo-7'-carbonyl)-amino-anthraquinone,
5-amino-1(5'',6'':7''-tri-chloro-2''-thionaphthene-3'-indole-indigo-7'-carbonyl)-amino-anthraquinone,
8-amino-1(5'',6'':7''-tri-chloro-2''-thionaphthene-3'-indole-indigo-7'-carbonyl)-amino-anthraquinone,
4-amino-1(4'',7''-di-chloro-2''-thionaphthene-3'-indole-indigo-7'-carbonyl)-amino-anthraquinone,
5-amino-1(4'',7''-di-chloro-2''-thionaphthene-3'-indole-indigo-7'-carbonyl)-amino-anthraquinone,
8-amino-1(4'',7''-di-chloro-2''-thionaphthene-3'-indole-indigo-7'-carbonyl)-amino-anthraquinone,
4-amino-1(4'',7''-di-methyl-5''-chloro-2''-thionaphthene-3'-indole-indigo-7'-carbonyl)-amino-anthraquinone,
5-amino-1(4'',7''-di-methyl-5''-chloro-2''-thionaphthene-3'-indole-indigo-7'-carbonyl)-amino-anthraquinone,
8-amino-1(4'',7''-di-methyl-5''-chloro-2''-thionaphthene-3'-indole-indigo-7'-carbonyl)-amino-anthraquinone,
4-amino-1(Bz4-chloro-6'',7''-benzo-2''-thionaphthene-3'-indole-indigo-7'-carbonyl)-amino-anthraquinone,
5-amino-1(Bz4-chloro-6'',7''-benzo-2''-thionaphthene-3'-indole-indigo-7'-carbonyl)-amino-anthraquinone,
8-amino-1(Bz4-chloro-6'',7''-benzo-2''-thionaphthene-3'-indole-indigo-7'-carbonyl)-amino-anthraquinone, 4-amino - 1(5'',6'' - benzo- 7'''-chloro- 2''-thio-naphthene - 3'-indole-indigo - 7'-carbonyl) - amino-anthraquinone, 5-amino - 1(5'',6''- benzo- 7'''-chloro- 2''-thio-naphthene - 3'-indole-indigo - 7'-carbonyl) - amino-anthraquinone, 8-amino - 1(5'',6''- benzo- 7'''-chloro- 2''-thio-naphthene - 3'-indole-indigo - 7'-carbonyl) - amino-anthraquinone, 4-amino-1(6''-methoxy-2''-thionaphthene-3'-indole - indigo-7'-carbonyl) - amino-anthraquinone, 5-amino-1(6''-methoxy-2''-thionaphthene-3'-indole - indigo-7'-carbonyl) - amino-anthraquinone, 8-amino-1(6''-methoxy-2''-thionaphthene-3'-indole - indigo-7'-carbonyl) - amino-anthraquinone, 4-amino - 1(4''- methoxy- 6''-chloro- 2''-thio-naphthene - 3'- indole-indigo - 7'-carbonyl) - amino-anthraquinone, 5 - amino - 1(4''-methoxy - 6''-chloro-2''-thio-naphthene - 3''- indole-indigo - 7'-carbonyl) - amino-anthraquinone, 8-amino - 1(4''- methoxy- 6''-chloro- 2''-thio-naphthene - 3''- indole-indigo - 7'-carbonyl) - amino-anthraquinone, 4-amino- 1(6''-methoxy-thioindigo-7'-carbonyl)-amino-anthraquinone, 5-amino- 1(6''-methoxy-thioindigo-7'-carbonyl)-amino-anthraquinone, 8-amino- 1(6''-methoxy-thioindigo-7'-carbonyl)-amino-anthraquinone, 4-amino - 1 -(Bz4 -bromo-4'',5''-naphthisatin-thionaphthene-indigo-5'- carbonyl) - amino-anthraquinone, 5-amino - 1 -(Bz4- bromo-4'',5''-naphthisatin-thionaphthene-indigo-5'- carbonyl) - amino-anthraquinone, 8-amino - 1 -(Bz4- bromo-4'',5''-naphthisatin-thionaphthene-indigo-5'- carbonyl) - amino-anthraquinone, 4-amino-1 -(acenaphthene-quinone-thionaph-thene - 6' - carbonyl) -amino-anthraquinone, having the formula:

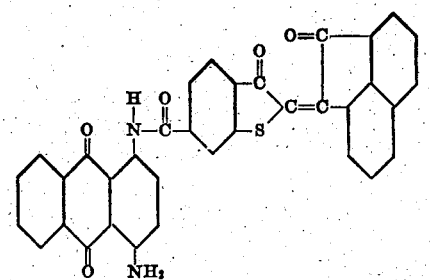

5-amino- 1 -(acenaphthene-quinone-thionaph-thene-6'-carbonyl)-amino-anthraquinone, 8-amino- 1 -(acenaphthene-quinone-thionaph-thene-6'-carbonyl)-amino-anthraquinone, 4-amino- 1 -(acenaphthene-quinone-thionaph-thene-7'-carbonyl)-amino-anthraquinone, 5-amino- 1 -(acenaphthene-quinone-thionaph-thene-7'-carbonyl)-amino-anthraquinone, 8-amino- 1 -(acenaphthene-quinone-thionaph-thene-7'-carbonyl)-amino-anthraquinone, 4 - amino - 1(4''-methyl-6''-chloro-thioindigo-7'-carbonyl)-amino-anthaquinone, 4-amino- 1(6''-methoxy-thioindigo-6'-carbonyl)-amino-anthraquinone, 5-amino- 1(6''-methoxy-thioindigo-6'-carbonyl)-amino-anthraquinone, 8-amino- 1(6''-methoxy-thioindigo-6'-carbonyl)-amino-anthraquinone, 4-amino-1 -(Bz4-chloro-6'',7''-benzo-thioindi-go-6'-carbonyl) -amino-anthraquinone, 5-amino-1 -(Bz4-chloro-6'',7''-benzo-thioindi-go-6'-carbonyl) -amino-anthraquinone, 8 - amino-1-(Bz4-chloro-6'',7''-benzo-thioindi-go-6'-carbonyl) -amino-anthraquinone, 4-amino-1-(5'',6'' -benzo-7''- chloro-thioindi-go-7'-carbonyl) -amino-anthraquinone, 5-amino-1(5'',6''-benzo-7''-chloro-thioindigo-7'-carbonyl) -amino-anthraquinone, 8-amino-1(5'',6''-benzo-7''-chloro-thioindigo-7'-carbonyl) -amino-anthraquinone, 4-amino - 1 (4''-methyl-6''- chloro-thioindigo-4'-ethoxy-7'-carbonyl) - amino - anthraquinone, 5-amino-1(4''-methyl- 6''- chloro - thioindigo-4'-ethoxy-7'-carbonyl) - amino - anthraquinone, 8-amino-1(4''-methyl- 6''- chloro - thioindigo-4'-ethoxy-7'-carbonyl) - amino - anthraquinone, 4 - amino- 1(5'',7''-dichloro-2'-thionaphthene-3''-indole-indigo-6'-carbonyl) - amino - anthraquinone, 5 - amino - 1(5'',7''-dichloro-2'-thionaphthene-3''-indole-indigo-6'-carbonyl) - amino - anthraquinone, 8-amino-1(5'',7''-dichloro- 2'- thionaphthene-3''-indole-indigo-6'-carbonyl) - amino - anthraquinone, 4-amino-1-(acenaphthene-quinone-thio-naph-thene-7'-carbonyl)-amino-anthraquinone, 5-amino-1 -(acenaphthene-quinone-thionaph-thene-7'-carbonyl)-amino-anthraquinone, 8-amino-1 -(acenaphthene-quinone-thionaph-thene-7'-carbonyl)-amino-anthraquinone, Di-ethyl-amino-ethyl-8-amino-quinoline, having the formula:

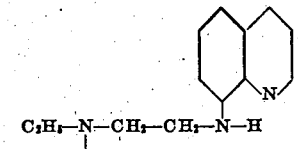

Alpha-di-methyl-amino-beta-methyl-gamma-methyl-propyl-8-amino-quinoline, having the formula:

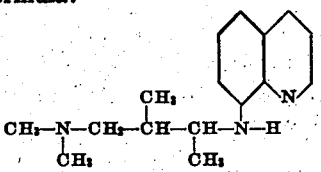

Alpha - di - ethyl-amino-delta-methyl-butyl-8-amino-6-methoxy-quinoline, having the formula:

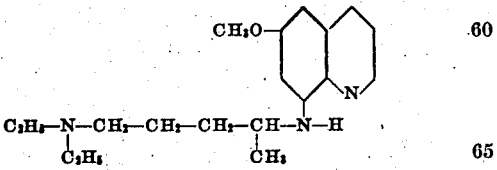

Alpha-di-ethyl - amino-beta-hydroxy-propyl-8-amino-6-methoxy-quinoline, having the formula:

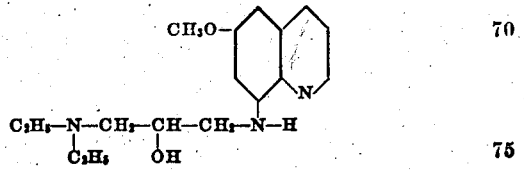

Mono-amino-diphenylene-sulfide,
2,2'-di-amino-diphenylene-sulfide,
2-amino-diphenylene-oxide,
2,7-di-amino-diphenylene-oxide,
2,6-di-amino-diphenylene-oxide,
1,3-di-amino-diphenylene-dioxide,
3-amino-xanthone,
2,7-di-amino-xanthone,
7-nitro-2-amino-xanthone,
4-amino-alizarine-ethylene-ether,
3-amino-naphthalic acid anhydride,
4-amino-1,8-naphthalic acid ethyl-imide,
4-amino-1,8-naphthalic acid-2'-methyl-phenyl-imide,
4-amino-1,8-naphthalic acid methyl-imide,
4-amino-1,8-naphthalic acid phenyl-imide,
4-amino-1,8-naphthalic acid 2'-chloro-phenyl-imide,
3,6-di-amino-fluoran,
Mono-amino-acridone,
Di-amino-acridone,
4-amino-6-nitro-quinazoline,
6,6'-di-amino-4,4'-di-quinazolinyl-para-para'-di-amino-benzene,
Perimidone,
4-amino-1,9(1'-methyl)-anthrapyridone,
5-amino-1,9(1'-ethyl)-anthrapyridone,
4-amino-Py-C-ethyl-1,9-anthrapyrimidine,
5-amino-Py-C-phenyl-1,9-anthrapyrimidine,
8-amino-Py-C-butyl-1,9-anthrapyrimidine,
4-amino-anthraquinone-2,1-phenyl-acridone,
5-amino-anthraquinone-2,1-phenyl-acridone,
8-amino-anthraquinone-2,1-phenyl-acridone,
7,7'-di-amino-thioindigo,
5,5'-di-chlor-7,7'-di-amino-thioindigo,
5,5'-di-amino-thioindigo,
6,6'-di-amino-thioindigo,
n-Amino-iso-indigotine,
4,4'-di-amino-indanthrone,
Tetra-amino-di-hydroxy-flavanthrone,
Anthraquinone-1(N)-naphthacridone.

So far no heterocyclic carbon compound containing a free amino group has been found that will not condense with 1-nitro-anthraquinone-6-carbonyl chloride under the disclosed conditions. This is true even in cases where substituent radicals on the heterocyclic nucleus exert an influence on the condensation.

Some of the heterocyclic compounds herein disclosed may exist in a tautomeric form. The invention covers the compound named regardless of the tautomeric form in which it exists.

In the course of the specification, certain formulæ have been given for the purpose of aiding in understanding the invention. These formulæ have not been proven except by the processes herein described and therefore it is not desired to limit the invention to the same.

The particular temperatures and time utilized for the condensation of the 1-nitro-anthraquinone-6-carbonyl chloride with the various heterocyclic amines depends upon the characteristics of the heterocyclic compound being treated. Temperatures higher than ordinary room or atmospheric temperatures are usually used because of the influence of temperature upon the speed of the reaction. High yields are to some extent dependent upon preferred or selected temperature ranges which may readily be determined empirically. So far as now appears, the condensation may be carried out at any temperature up to the decomposition point of the reactants or the final product. Obviously, temperatures high enough to cause substantial decomposition of reactants would not be economical. It will, therefore, be apparent that the invention is not limited to the specific temperatures and temperature ranges set out in the specific examples. This observation also applies to the time of reaction, a factor readily determinable empirically.

As will be clear from the specific examples, the amount of solvent or suspension media (if any) used for carrying out the condensation may be varied over a wide range, depending largely upon the characteristics of the particular condensation and the convenience of the person carrying out the same. This fact is one readily determinable by those skilled in the art.

Particular mention may be made of such reaction media as nitrobenzene, the chloro-benzenes (particularly tri-chloro-benzene and ortho-di-chloro-benzene), the xylenes (for example commercial xylene mixtures), naphthalene, solvent naphtha and the like.

Throughout the specification and claims the term "vat color" is used to cover compounds susceptible to vatting by any of the methods known to the art (see "Colour Index"). It includes vat dyes and vattable compounds which are not dyes.

The compounds produced by this invention are colored and are valuable for the purpose of coloring various substances. These materials are also valuable as intermediates for vat color and anthraquinone dyes.

As many apparently widely different embodiments of this invention may be made without departing from the spirit and scope thereof, it is to be understood that I do not limit myself to the specific embodiments thereof except as defined in the appended claims.

I claim:

1. The process which comprises condensing a 1-nitro-anthraquinone-6-carbonyl halide with a heterocyclic amine containing at least one hydrogen atom attached to the amine nitrogen atom.

2. The compound having the formula:

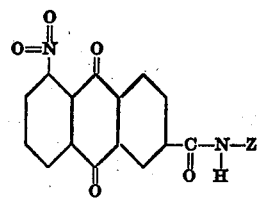

Z representing a heterocyclic radical.

3. The process which comprises condensing a 1-nitro-anthraquinone-6-carbonyl halide with a heterocyclic amine containing at least one hydrogen atom attached to the amine nitrogen atom, the said heterocyclic amine containing a pyridine ring nucleus.

4. The process which comprises condensing a 1-nitro-anthraquinone-6-carbonyl halide with a heterocyclic amine containing at least one hydrogen atom attached to the amine nitrogen atom, the said heterocyclic amine containing a pyrrol nucleus.

5. The process which comprises condensing a 1-nitro-anthraquinone-6-carbonyl halide with a heterocyclic amine containing at least one hydrogen atom attached to the amine nitrogen atom, the said heterocyclic amine containing an azole nucleus.

6. The compound having the formula:

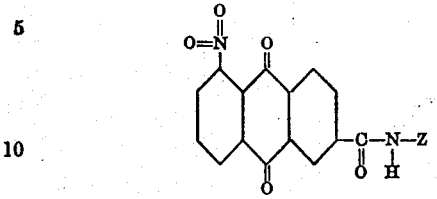

Z representing a heterocyclic radical containing a pyridine nucleus.

7. The compound having the formula:

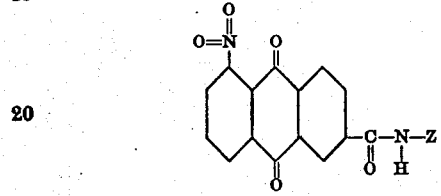

Z representing a heterocyclic radical containing a pyrrol nucleus.

8. The compound having the formula:

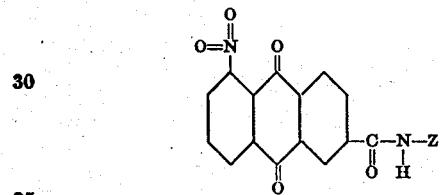

Z representing a heterocyclic radical containing an azole nucleus.

9. The compound having the formula:

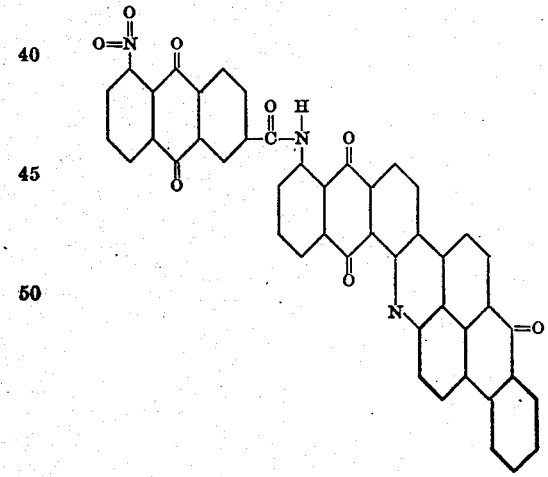

obtainable by condensing 1-nitro-anthraquinone 6-carbonyl-chloride with 5'-amino-anthraquinone-1'-Bz-1-benzanthrone acridine.

10. The compound having the formula:

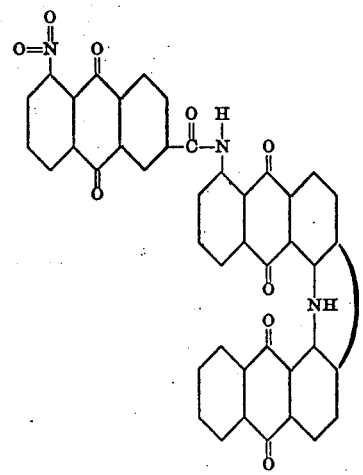

obtainable by condensing 1-nitro-anthraquinone-6-carbonyl-chloride with 5'-amino-1,1'-dianthrimide-carbazole.

11. The compound having the formula:

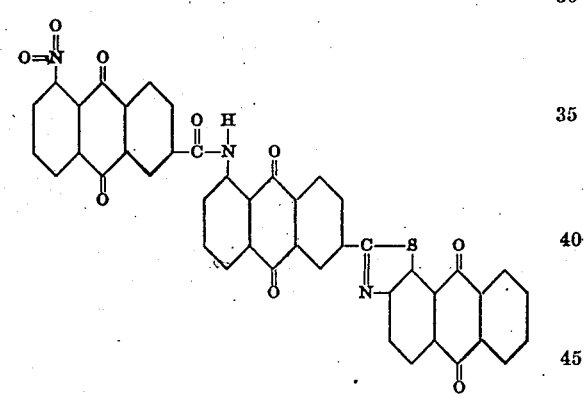

obtainable by condensing 1-nitro-anthraquinone-6-carbonyl-chloride with 5'-amino-1(S)-2,2'-dianthraquinoyl-thiazole.

EARL EDSON BEARD.

Certificate of Correction

Patent No. 2,043,985. June 16, 1936.

EARL EDSON BEARD

It is hereby certified that errors appear in the printed specification of the above numbered patent requiring correction as follows: Page 6, first column, line 15, in the last anthraquinone nucleus of the formula, for

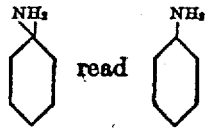

page 7, first column, line 45, for the numeral "6" read *6'*; page 12, first column, line 38, for "n-Amino-iso-indigotine" read *5:5'-di-amino-indigo*; and line 41, for "Anthraquinone-1(N)-naphthacridone" read *Mono-amino-flavanthrone*; and that the said Letters Patent should be read with these corrections therein that the same may conform to the record of the case in the Patent Office.

Signed and sealed this 22nd day of September, A. D. 1936.

[SEAL]

HENRY VAN ARSDALE,
*Acting Commissioner of Patents.*